US008485361B2

(12) United States Patent
Rauleder et al.

(10) Patent No.: US 8,485,361 B2

(45) Date of Patent: Jul. 16, 2013

(54) LARGE CONTAINER FOR HANDLING AND TRANSPORTING HIGH-PURITY AND ULTRA HIGH PURITY CHEMICALS

(75) Inventors: Hartwig Rauleder, Rheinfelden (DE); Ekkehard Mueh, Rheinfelden (DE); Rainer Nicolai, Basel (CH); Harald Klein, Shanghai (CN); Reinhold Schork, Rheinfelden (DE)

(73) Assignee: Evonik Degussa GmbH, Essen (DE)

( * ) Notice: Subject to any disclaimer, the term of this patent is extended or adjusted under 35 U.S.C. 154(b) by 350 days.

(21) Appl. No.: 12/738,799

(22) PCT Filed: Aug. 22, 2008

(86) PCT No.: PCT/EP2008/061017

§ 371 (c)(1),
(2), (4) Date: Jul. 13, 2010

(87) PCT Pub. No.: WO2009/053134

PCT Pub. Date: Apr. 30, 2009

(65) Prior Publication Data

US 2010/0270296 A1 Oct. 28, 2010

(30) Foreign Application Priority Data

Oct. 23, 2007 (DE) ......................... 10 2007 050 573

(51) Int. Cl.

| | |
|---|---|
| ***B65D 85/84*** | (2006.01) |
| ***F16K 11/65*** | (2006.01) |
| ***F17D 1/00*** | (2006.01) |
| ***A01G 25/16*** | (2006.01) |

(52) U.S. Cl.

USPC .... 206/524.6; 222/153.08; 222/3; 222/400.7; 220/1.5; 220/581; 137/572; 137/625.18; 137/625; 137/266

(58) Field of Classification Search

USPC .................. 206/524.6, 0.6, 0.7; 220/1.5, 917, 220/565, 257.2; 222/152, 545, 3; 414/290, 414/292; 137/625.39, 561, 516, 515, 572, 137/625.18, 625, 266; 251/210; 187/251; 212/272; 294/82.11; 303/90; 403/33, 64; 210/199

See application file for complete search history.

(56) References Cited

U.S. PATENT DOCUMENTS

| | | | | |
|---|---|---|---|---|
| 576,936 | A * | 2/1897 | Badt | 429/82 |
| 664,383 | A * | 12/1900 | Claude et al. | 222/3 |
| 2,407,124 | A * | 9/1946 | Anderson et al. | 220/1.5 |

(Continued)

FOREIGN PATENT DOCUMENTS

| | | |
|---|---|---|
| DE | 10 2005 024 210 | 2/2007 |
| EP | 0 226 118 | 6/1987 |

(Continued)

OTHER PUBLICATIONS

Drumsystems.com web page Circa Jul. 19, 2007.*

(Continued)

*Primary Examiner* — J. Gregory Pickett
*Assistant Examiner* — James M Van Buskirk
(74) *Attorney, Agent, or Firm* — Oblon, Spivak, McClelland, Maier & Neustadt, L.L.P.

(57) ABSTRACT

The invention relates to an empty container (1) for receiving air- and/or moisture-sensitive compounds, comprising a connecting unit (2) and an inner volume of at least 300 liters and adapters for connecting the empty container, and to the use thereof.

9 Claims, 1 Drawing Sheet

Empty container for high purity or ultra high purity compounds

U.S. PATENT DOCUMENTS

| | | | | | |
|---|---|---|---|---|---|
| 2,572,175 | A * | 10/1951 | McPherson | 251/30.05 |
| 3,002,894 | A * | 10/1961 | Rungaldier et al. | 435/3 |
| 3,144,242 | A * | 8/1964 | Retzlaff | 366/3 |
| 3,566,912 | A * | 3/1971 | Dunkelis | 137/493 |
| 3,695,449 | A * | 10/1972 | Scaglione | 210/429 |
| 3,727,623 | A * | 4/1973 | Robbins | 137/1 |
| 3,776,599 | A * | 12/1973 | Reuter | 406/15 |
| 3,878,234 | A * | 4/1975 | Atwell et al. | 556/468 |
| 4,084,024 | A * | 4/1978 | Schumacher | 427/215 |
| 4,582,480 | A | 4/1986 | Lynch et al. | |
| 4,738,356 | A | 4/1988 | Gunkel et al. | |
| 4,905,855 | A * | 3/1990 | Troiano et al. | 220/581 |
| 4,923,687 | A | 5/1990 | Schork et al. | |
| 5,026,533 | A | 6/1991 | Matthes et al. | |
| 5,152,437 | A * | 10/1992 | Klein et al. | 222/400.7 |
| 5,356,045 | A * | 10/1994 | Parks et al. | 222/153.08 |
| 5,616,755 | A | 4/1997 | Seiler et al. | |
| 5,654,459 | A | 8/1997 | Kropfgans et al. | |
| 5,698,726 | A | 12/1997 | Rauleder et al. | |
| 5,790,252 | A * | 8/1998 | Masumura et al. | 356/450 |
| 5,852,206 | A | 12/1998 | Horn et al. | |
| 6,142,024 | A | 11/2000 | Rauleder et al. | |
| 6,150,551 | A | 11/2000 | Kropfgans et al. | |
| 6,177,584 | B1 | 1/2001 | Loewenberg et al. | |
| 6,222,056 | B1 | 4/2001 | Bade et al. | |
| 6,291,698 | B1 | 9/2001 | Bade et al. | |
| 6,372,190 | B1 | 4/2002 | Zehe et al. | |
| 6,434,783 | B1 * | 8/2002 | Arnold et al. | 15/301 |
| 6,585,941 | B2 | 7/2003 | Zehe et al. | |
| 6,680,038 | B2 | 1/2004 | Rauleder et al. | |
| 6,727,375 | B2 | 4/2004 | Steding et al. | |
| 6,889,726 | B2 * | 5/2005 | Richey et al. | 141/83 |
| 6,987,565 | B2 * | 1/2006 | Hirahara et al. | 356/316 |
| 7,204,963 | B2 | 4/2007 | Rauleder et al. | |
| 7,410,914 | B2 | 8/2008 | Kuehnle et al. | |
| 7,507,850 | B2 | 3/2009 | Muh et al. | |
| 2001/0006102 | A1 * | 7/2001 | Nishimura et al. | 165/81 |
| 2002/0020449 | A1 | 2/2002 | Imai | |
| 2008/0178809 | A1 * | 7/2008 | Spohn et al. | 118/726 |
| 2008/0197014 | A1 | 8/2008 | Lang et al. | |
| 2008/0283972 | A1 | 11/2008 | Muh et al. | |
| 2008/0289690 | A1 | 11/2008 | Sonnenschein et al. | |
| 2009/0020413 | A1 | 1/2009 | Popp et al. | |
| 2009/0259063 | A1 | 10/2009 | Lang et al. | |
| 2010/0080746 | A1 | 4/2010 | Lang et al. | |
| 2010/0296994 | A1 | 11/2010 | Rauleder et al. | |

FOREIGN PATENT DOCUMENTS

| | | |
|---|---|---|
| WO | 86 01232 | 2/1986 |
| WO | 00 00767 | 1/2000 |
| WO | 00 79170 | 12/2000 |

OTHER PUBLICATIONS

AK Steel Product Data Sheet on 316/316L Stainless Steel Circa Jul. 2007.*

Report from ASM International; 414—vol. 10(4) Aug. 2001; Electropolishing of 316L Stainless Steel for Anticorrosion Passivation.*

U.S. Appl. No. 12/999,240, filed Dec. 15, 2010, Seliger, et al.

U.S. Appl. No. 13/059,692, filed Feb. 18, 2011, Lang, et al.

U.S. Appl. No. 13/121,756, filed Mar. 30, 2011, Lang, et al.

U.S. Appl. No. 61/110,827, filed Nov. 3, 2008, Rauleder, et al.

U.S. Appl. No. 13/121,761, filed Mar. 30, 2011, Rauleder, et al.

U.S. Appl. No. 13/121,758, filed Mar. 30, 2011, Lang, et al.

U.S. Appl. No. 61/111,127, filed Nov. 4, 2008, Panz.

U.S. Appl. No. 13/121,754, filed Mar. 30, 2011, Panz, et al.

U.S. Appl. No. 61/111,125, filed Nov. 4, 2008, Panz.

U.S. Appl. No. 13/121,751, filed Mar. 30, 2011, Panz, et al.

U.S. Appl. No. 61/110,828, filed Nov. 3, 2008, Rauleder, et al.

U.S. Appl. No. 13/121,759, filed Mar. 30, 2011, Rauleder, et al.

U.S. Appl. No. 61/112,891, filed Nov. 10, 2008, Lang, et al.

U.S. Appl. No. 13/128,442, filed May 10, 2011, Lang, et al.

U.S. Appl. No. 13/121,702, filed Mar. 30, 2011, Rauleder, et al.

U.S. Appl. No. 12/738,246, filed Jun. 9, 2010, Rauleder, et al.

U.S. Appl. No. 12/811,925, filed Jul. 7, 2010, Mueh, et al.

U.S. Appl. No. 12/528,087, filed Aug. 21, 2009, Schwarz, et al.

U.S. Appl. No. 12/812,857, filed Jul. 14, 2010, Mueh, et al.

U.S. Appl. No. 12/681,114, filed Apr. 1, 2010, Mueh, et al.

* cited by examiner

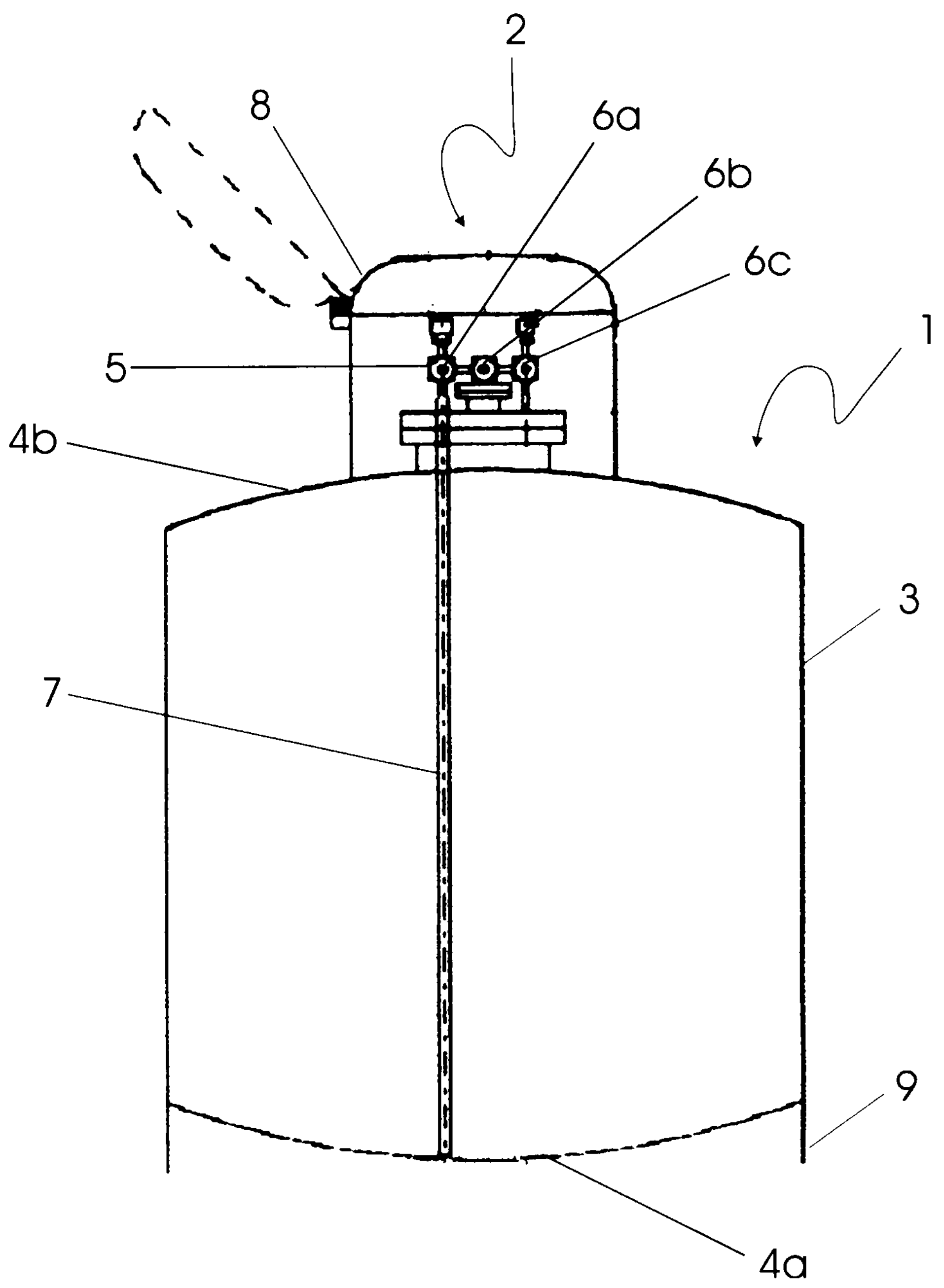
Empty container for high purity or ultra high purity compounds

LARGE CONTAINER FOR HANDLING AND TRANSPORTING HIGH-PURITY AND ULTRA HIGH PURITY CHEMICALS

CROSS REFERENCE TO RELATED APPLICATIONS

This application is the National Stage of PCT/EP08/061,017, filed Aug. 22, 2008, the disclosure of which is incorporated herein by reference in its entirety. Priority is claimed to German Application No. 102007050573.8, filed Oct. 23, 2007, the disclosure of which is incorporated herein by reference in its entirety.

The invention relates to an empty container for accommodating air- and/or moisture-sensitive chemicals, having a connecting unit and an internal volume of at least 300 liters and also adapters for connecting this empty container and also its use.

For example, silicon compounds which are used in microelectronics have to meet particularly stringent purity requirements. The corresponding silicon compounds are needed, inter alia, for producing highly pure, thin layers of silicon by means of epitaxy or silicon nitride (SiN), silicon oxide (SiO), silicon oxynitride (SiON), silicon oxycarbide (SiOC) or silicon carbide (SiC). In these fields of use, impurities in the starting compounds in even the ppb to ppt range can interfere by leading to undesirable changes in the properties of the layers produced therefrom. The compounds mentioned in the required purity are sought-after starting compounds in the field of electronics, the semiconductor industry, solar cell production and also in the pharmaceutical industry.

However, a container size of from 19 liters to about 240 liters has hitherto been used for handling and transporting high purity or ultra high purity chemicals. The high purity or ultra high purity chemicals are utilized, in particular, in the semiconductor industry where ultra high purity or electronic grade silicon and germanium compounds are at present consumed in quantities of hundreds of metric tons. These are, in particular, trichlorosilane, silicon tetrachloride or tetraethoxysilane, which are used for producing epitactic silicon layers on an Si wafer or for producing silicon dioxide insulation layers on electronic chips.

These small container sizes have hitherto been employed in order to minimize the risks of possible contamination, for example during use. The container size has in the past been matched essentially to the subsequent process step, so that a container would be completely emptied during said process step. This procedure was largely able to avoid contamination, for example by hydrolysis products, which can be formed by multiple opening and closing of a container.

Due to the considerably increased demand for these ultra high purity compounds, this procedure now requires the use of many such containers. There are many disadvantages which result therefrom; firstly the greatly increased number of containers, with each empty container incurring high procurement costs, and also the labor-intensive handling by the packager and the user. Associated therewith are the intensive cleaning of a large number of empty containers and the costs incurred thereby. Due to the increased throughputs which are achieved today in the respective production steps, the risk of product contamination of the ultra high purity compounds on changing the containers within an ongoing process has increased considerably.

It was an object of the present invention to develop an empty container which overcomes the disadvantages mentioned and can be realized inexpensively.

This object is achieved by an empty container for accommodating air- and/or moisture-sensitive liquids or condensable compounds, which has a connecting unit and has an internal volume of at least 300 liters, where at least one shutoff device is assigned to the connecting unit.

Empty containers according to the invention having a connecting unit, comprising vessels or containers for accommodating liquid chemicals, in particular air- and/or moisture-sensitive liquids or condensable compounds, where the empty container has an internal volume of at least 300 liters (l) and at least one shutoff device, in particular two or three diaphragm valves, is/are assigned to the connecting unit.

Owing to the suitability for accommodating high purity or ultra high purity air- and/or moisture-sensitive liquids or condensable compounds which can, for example, additionally be corrosive and/or caustic, the construction, e.g. the compressive strength, of the empty container and also the material used and the freedom from leaks of the empty container with connecting unit have to meet particular requirements.

Such high purity or ultra high purity compounds can be, for example, silicon or germanium compounds, without being restricted thereto. An example is monosilane ($SiH_4$) which is gaseous at room temperature and can be condensed under pressure into an empty container. This compound is spontaneously flammable and reacts immediately on contact with atmospheric oxygen to form silicon dioxide and water. Silicon tetrachloride, on the other hand, is a compound which is liquid at room temperature and begins to fume and hydrolyzes in the presence of moist air. Further high purity or ultra high purity compounds can be trichlorosilane, dichlorosilane, monochlorosilane, hexachlorodisilane, hexamethyldisilazane, tetraethoxysilane, methyltriethoxysilane, dimethyldimethoxysilane, germanium tetrachloride or monogermane, which all have to be handled with exclusion of moisture and/or under a protective gas atmosphere.

For the present purposes, high purity or ultra high purity compounds are compounds whose content of impurities is in the ppb range; in the case of ultra high purity, impurities are present only in the ppt range and below. Contamination of silicon or germanium compounds with other metal compounds is in the ppb range down to the ppt range, preferably in the ppt range. The required purity can be checked by means of GC, IR, NMR, ICP-MS or by resistance measurement or GD-MS after deposition of the silicon or germanium.

In advantageous embodiments, an empty container has an internal volume of at least 300 liters, preferably at least 350 or 400 liters (l) or from 400 to 850 liters, from 400 to 1130 liters or from 400 to 20 000 liters. The internal volume is particularly preferably about 850 liters, 1130 liters or 20 000 liters. The expression empty container refers to the vessel or container which has been emptied, while the term container describes the totality of the empty container filled with a compound.

The shape of the empty container corresponds approximately to that of a cylindrical wall having a convex bottom and a convex top, with the connecting unit being assigned to the top. This construction makes it possible to realize pressure-resistant empty containers in which a large pressure difference between internal pressure and external pressure can prevail, for example in the case of compounds condensed under pressure.

To avoid corrosion or reaction of an introduced compound with the material of the empty container and/or the connecting unit, these are made of inert material by means of which the desired pressure resistance can be achieved. The empty container, the connecting unit and/or all parts which come into contact with the compounds introduced are preferably made of stainless steel, particularly preferably stainless steel 316 L, with the stainless steel or the stainless steel 316 L particularly preferably being electropolished.

The connecting unit has, for filling and emptying the empty container, a multiway system having two or more shutoff devices; in particular, the connecting unit has a three-way system having two or three shutoff devices. As shutoff device, it is possible to use a valve or a tap or a closure, with the use of a valve being preferred. The valve is particularly preferably a diaphragm valve, a ball valve or a bellows valve.

An immersion tube is assigned to the multiway system, in particular the three-way system having at least two or three shutoff devices. The immersion tube can preferably likewise be made of stainless steel, preferably stainless steel 316 L, and is particularly preferably electropolished and extends down to the vicinity of the convex bottom. An axial arrangement of the immersion tube is preferred, so that it can reach down to the vicinity of the lowest point of the convex bottom. This measure allows maximum emptying of the container.

To reduce the contamination risks further, the connecting unit of the empty container can be able to be connected to a production plant, in particular a distillation column. This can occur directly via the multiway system of the connecting unit or by means of a suitable adapter. In this way, the distillate can be collected directly in the empty container, for example. A preceding in-process control system can allow monitoring of the purity of the distillate. This can be effected, for example, directly by means of spectroscopic methods in the feed lines between the column and the empty container. In this way, transfer is avoided and the risk of contamination is minimized. The process is appropriately monitored continuously by means of "on-line analysis".

To protect against damage, for example during transport of the container or empty container, the connecting unit is arranged in a protective device. The protective device usually comprises a cylindrical wall and a lid which can be swiveled or flipped and is arranged on the convex end around the connecting unit. The connecting unit is preferably completely enclosed by the protective device.

To ensure a safe upright position during filling, storage, handling or transport, the empty container and/or container can have a support on the convex bottom, which support can be in the form of supports arranged in a circle or a cylindrical wall. As an alternative, the empty container can be mounted on an appropriately shaped base or in a frame, preferably of metal.

In addition, the empty container can have recesses or fixing means which allow loading/unloading by means of a crane. This is preferred particularly when the empty container size is 850 liters or above. The recesses or fixing means are preferably located on the cylindrical wall of the empty container.

The invention further provides an adapter for connecting the empty container to the apparatus for producing high purity or ultra high purity compounds, in particular for connecting the empty container to a distillation column. This adapter, which is provided by the filler of the container, preferably has a multiway system for flushing the adapter and components connected thereto with inert gas and also for evacuating these items.

The invention also provides a container according to the invention comprising the empty container which contains high purity or ultra high purity silicon or germanium compounds, in particular silicon tetrachloride, trichlorosilane, dichlorosilane, monochlorosilane, hexachlorodisilane, monosilane, hexamethyldisilazane, tetraethoxysilane, methyltriethoxysilane, dimethyldimethoxysilane, germanium tetrachloride or monogermane. In particular, the quality of the high purity or ultra high purity compounds does not change significantly during handling, storage and/or transport. For the present purposes, high purity compounds are compounds which have impurities only in the ppb range; ultra high purity refers to impurities in the ppt range and below. This applies in particular to contamination of silicon or germanium compounds with other metal compounds which are present in the ppb range or below, preferably in the ppt range.

The invention further provides an adapter for connecting the container to the apparatus for taking off and/or consuming high purity or ultra high purity compounds, in particular for connecting the container to a production plant for reacting the high purity or ultra high purity compounds. This adapter, which is provided by the consumer, preferably has a multiway system for flushing the adapter and components connected thereto with inert gas and also for evacuating these items.

The invention likewise provides for the use of empty containers according to the invention for storing, handling and/or transporting high purity and ultra high purity compounds, in particular chemicals, particularly preferably for storing, handling and/or transporting high purity and ultra high purity silicon and/or germanium compounds.

The empty containers and containers according to the invention allow a significant reduction in the number of containers and the frequency of changing the empty container or the container at plants where the containers are filled and/or the contents are consumed. This changing of containers is particularly critical in the case of high purity and ultra high purity compounds, for example the precursors trichlorosilane or silicon tetrachloride for producing epitactic silicon layers on Si wafers. The same applies to tetraethoxysilane used for depositing insulation layers composed of silicon dioxide.

Trichlorosilane and tetrachlorosilane are, for example, at present handled in 200 or 240 liter containers and tetraethoxysilane in 19, 38 and 200 liter containers. A change from the 19 liter containers customary at present to the 1130 liter containers according to the invention will alone reduce the frequency of replacement of an empty container or a container at the plants from 60 replacements to one replacement. The change from 240 liter containers to 1130 liter containers reduces the frequency of changing the containers by a factor of 5.5. The risk of hydrolysis or decomposition can be considerably reduced thereby.

The following example as shown in FIG. 1 illustrates the empty container or container of the invention without restricting the invention to this example.

The empty container (1) for accommodating air- and/or moisture-sensitive liquids or condensable compounds which is shown in FIG. 1 has a connecting unit (2) having a shutoff device (6), with the connecting unit being able to be connected, for example, by means of a flange connection to the empty container. A sealing ring and closure means can additionally be assigned to the flange connection in order to ensure hermetic sealing of the empty container or container. The connecting unit has a multiway valve system or general multiway system (5) having three shutoff devices (6*a*, 6*b*, 6*c*), which in this variant in each case correspond to a diaphragm valve. A connection of the valve (6*c*) to the empty container extends, in the vicinity of the connecting unit, right into the empty container or container, valve (6*b*) is arranged between the two valves (6*a* and 6*c*). In addition, an immersion tube (7) is assigned to the multiway system (5) and is assigned to the diaphragm valve (6*a*). The empty container or container has a cylindrical wall (3) and at the respective ends of the cylindrical wall a convex bottom (4*a*) and a convex top (4*b*). All parts which come into contact with the high purity or ultra high purity compounds are made of electro-polished stainless steel 316 L. The connecting unit (2) is arranged in a protective device (8). The support (9) makes it possible for the container to be set down on flat surfaces.

To flush the connecting unit (2), a valve (6*c*) is, for example, connected to a gas supply, for example a helium source, and is in a position in which the gas supply communicates with valve (6*b*). The valve (6*a*) is connected to a gas receiver and likewise brought into a position in which communication between the gas receiver and the valve (6*b*) is established. In this way, the connecting unit (2), in particular the multiway system (5), can be flushed with flushing gas, preferably inert gas, by introduction of gas via the valve (6*c*). If a vacuum pump instead of the gas receiver is connected to the valve (6*a*), alternate flushing and evacuation of the connecting unit can be carried out.

To flush the empty container or container with inert gas in order to prevent hydrolysis or decomposition of high purity or ultra high purity compounds, the valve (6*a*) is in a position so that it communicates with a gas receiver and at the same time with the internal volume of the empty container (1). Valve (6*b*) is in such a position that the connection between the valves (6*a*) and (6*c*) is closed. The valve (6*c*) is open into the empty container and connected in an open manner to a gas supply, for example a helium source. In this way, the gas, in particular helium, flows through the internal volume of the empty container (1), the immersion tube and the connecting unit. When the gas receiver is supplemented by a vacuum pump, alternate flushing and evacuation of the empty container can be carried out by alternately opening and closing the valve (6*c*). Correspondingly, the gas space above liquid compounds in containers can also be flushed when the valve (6*c*) is connected to a gas receiver and the valve (6*a*) is connected to a gas supply. To flush the gas space above liquid compounds, the empty container or container preferably has a further valve which is connected to an opening in the convex end.

To fill the empty container with a liquid compound, the valve (6*b*) is in a position which prevents communication of the valves (6*a* and 6*c*). Via the valve (6*a*), liquid is introduced through the immersion tube into the empty container by means of pumping, pressing or flowing-in via geodetic height. The gas/inert gas to be displaced flows out through the valve (6*c*) which is connected to a gas receiver.

To empty the container, the valve (6*b*) remains in the above-described position and inert gas is pushed into the container through the open valve (6*c*) which is connected to a gas reservoir. The valve (6*a*) can be connected via an adapter or directly to a consumer. The liquid compound leaves the container through the immersion tube and through the open valve (6*a*) and the container is emptied in this way.

The invention claimed is:

1. A container, comprising:
a cylindrical wall;
a convex bottom;
a convex top; and
a connecting unit located on the convex top;
wherein the connecting unit comprises:
a multiway valve system having a valve (a), a valve (b) and a valve (c),
the valve (a) which at least communicates with a first external connection device, an immersion tube which extends to a lowest point of the convex bottom in an interior of the container and the valve (b),
the valve (b) is intermediate between and communicates only with valves (a) and (c), and
the valve (c) at least communicates with a second external connection device, the valve (b) and the interior of the container at the convex top,
and further wherein
the container is pressure resistant being capable of pressurization and evacuation, and
an internal volume of the container is from 300 to 20,000 liters.

2. The container according to claim 1, wherein a material of construction of the wall, top, bottom, immersion tube, valves and communication devices is stainless steel.

3. The container according to claim 2, wherein the stainless steel is 316L stainless steel.

4. The container according to claim 3, wherein the 316L stainless steel is electropolished.

5. The container according to claim 1, wherein valves (a), (b) and (c) are selected from the group consisting of a diaphragm valve, a ball valve and a bellows valve.

6. The container according to claim 1, further comprising at least one of a protective device for the multiway valve system, a support device for standing the container upright, an attachment for a crane or other transport unit and a valve further to (a), (b) and (c) which is independent of (a), (b) and (c) and connects to an opening in the convex top of the container.

7. The container according to claim 1 which comprises a high purity or ultra high purity compound.

8. The container according to claim 4 which comprises a high purity or ultra high purity silicon or germanium compound.

9. The container according to claim 8 wherein the high purity or ultra high purity silicon or germanium compound is selected from the group consisting of silicon tetrachloride, trichlorosilane, dichlorosilane, monochlorosilane, hexachloro-disilane, monosilane, hexamethyldisilazane, tetraethoxysilane, methyltriethoxy-silane, dimethyldimethoxysilane, germanium tetrachloride and monogermane.

* * * * *